(12) United States Patent
Lee et al.

(10) Patent No.: US 10,564,759 B2
(45) Date of Patent: Feb. 18, 2020

(54) METHOD AND APPARATUS FOR PROVIDING TOUCH INTERFACE

(75) Inventors: Kwang-Yong Lee, Seoul (KR); Woo-Jin Jung, Seongnam-si (KR); Beom-Soo Cho, Seongnam-si (KR); Yong-Gook Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 13/335,608

(22) Filed: Dec. 22, 2011

(65) Prior Publication Data

US 2012/0162111 A1   Jun. 28, 2012

(30) Foreign Application Priority Data

Dec. 24, 2010   (KR) .......................... 10-2010-0134866

(51) Int. Cl.
| | |
|---|---|
| *G06F 3/041* | (2006.01) |
| *G06F 3/048* | (2013.01) |
| *G06F 3/0488* | (2013.01) |

(52) U.S. Cl.
CPC ........ *G06F 3/0416* (2013.01); *G06F 3/04883* (2013.01)

(58) Field of Classification Search
CPC ........ G06F 3/041; G06F 3/044; G06F 3/0488; G06F 3/04883
USPC ................................................ 345/173–176
See application file for complete search history.

(56) References Cited

U.S. PATENT DOCUMENTS

| | | | |
|---|---|---|---|
| 2005/0052427 A1* | 3/2005 | Wu et al. ........................ | 345/173 |
| 2006/0284858 A1* | 12/2006 | Rekimoto ..................... | 345/173 |
| 2007/0097096 A1 | 5/2007 | Rosenberg | |
| 2008/0036743 A1* | 2/2008 | Westerman ............. | G06F 3/038 |
| | | | 345/173 |
| 2008/0158185 A1* | 7/2008 | Westerman .................... | 345/173 |
| 2008/0168384 A1 | 7/2008 | Platzer et al. | |
| 2008/0168403 A1* | 7/2008 | Westerman et al. .......... | 715/863 |
| 2009/0073194 A1* | 3/2009 | Ording ........................... | 345/672 |
| 2010/0026649 A1* | 2/2010 | Shimizu et al. ............... | 345/173 |
| 2010/0044121 A1 | 2/2010 | Simon et al. | |
| 2010/0079405 A1* | 4/2010 | Bernstein ............ | G06F 3/04883 |
| | | | 345/174 |
| 2010/0127997 A1 | 5/2010 | Park et al. | |
| 2010/0263946 A1 | 10/2010 | Miyazaki | |
| 2010/0289754 A1* | 11/2010 | Sleeman et al. .............. | 345/173 |
| 2010/0328209 A1* | 12/2010 | Nakao ........................... | 345/157 |

(Continued)

FOREIGN PATENT DOCUMENTS

| | | |
|---|---|---|
| CN | 101488069 A | 7/2009 |
| CN | 101583924 A | 11/2009 |
| EP | 2249229 A1 | 11/2010 |

(Continued)

OTHER PUBLICATIONS

International Search Report dated Jul. 30, 2012 in connection with International'Application No. PCT/KR2011/009587.

(Continued)

*Primary Examiner* — Ariel A Balaoing

(57) ABSTRACT

An apparatus performs a method for providing a touch interface. The method includes receiving a touch input from a touch detection unit, detecting touch characteristics according to the touch input, and generating events different from each other according to the detected touch characteristics.

24 Claims, 12 Drawing Sheets

(56) References Cited

U.S. PATENT DOCUMENTS

2011/0296333 A1* 12/2011 Bateman ............... G06F 3/0416
715/773
2012/0092283 A1 4/2012 Miyazaki

FOREIGN PATENT DOCUMENTS

| EP | 2256591 A1 | 12/2010 |
| JP | 07-306752 | 11/1995 |
| JP | 3154614 B2 | 4/2001 |
| JP | 2005-100391 | 4/2005 |
| KR | 10-2005-0065943 | 6/2005 |
| WO | 2010137400 A1 | 12/2010 |

OTHER PUBLICATIONS

Written Opinion of the International Searching Authority dated Jul. 30, 2012 in connection with International Application No. PCT/KR2011/009587.

The First Office Action, dated Jul. 22, 2015, in connection with Chinese Patent Application No. 201180062365.1, 21 pages.

Second Office Action dated Feb. 16, 2016 in connection with Chinese Application No. 201180062365.1, 19 pages.

Notice of Non-Final Rejection dated Aug. 31, 2016 in connection with Korean Application No. 10-2010-0134866, 7 pages.

Foreign Communication From a Related Counterpart Application, European Application No. 11851959.4-1507, Extended European Search Report dated Mar. 22, 2017, 10 pages.

Foreign Communication from Related Counterpart Application; European Patent Application No. 11851959.4; Communication Pursuant to Article 94(3) dated Jan. 25, 2018; 9 pages.

European Patent Office, "Communication pursuant to Article 94(3) EPC," Application No. EP11851959.4, dated Nov. 7, 2018, 5 pages.

Communication pursuant to Article 94(3) EPC dated May 9, 2019 in connection with European Patent Application No. 11 851 959.4, 6 pages.

* cited by examiner

METHOD AND APPARATUS FOR PROVIDING TOUCH INTERFACE

CROSS-REFERENCE TO RELATED APPLICATION(S) AND CLAIM OF PRIORITY

The present application is related to and claims the benefit of priority to Korean Patent Application No. 10-2010-0134866, filed on Dec. 24, 2010, in the Korean Intellectual Property Office, the disclosure of which is incorporated herein in its entirety by reference.

TECHNICAL FIELD OF THE INVENTION

The inventive concept relates to a method and apparatus for providing a touch interface, and more particularly, to a method and apparatus for providing a novel touch interface for recognizing the touch of hand knives and palms.

BACKGROUND OF THE INVENTION

Touch functions using a touch screen provide an important role in portable terminals these days. A user may perform an input operation using a touch screen while minimizing the use of input keys. As hardware technologies grow more advanced, functions of smart phones such as GALAXY phones or iPHONEs and tablet PCs such as iPADs come close to those of general PCs. Thus, novel input methods for easily executing various functions are desired.

SUMMARY OF THE INVENTION

To address the above-discussed deficiencies of the prior art, it is a primary object to provide a novel touch interface for recognizing the touch of hand knives and palms, unlike an interface for recognizing the touch of fingers.

According to an aspect of the present disclosure, there is provided a method for providing a touch interface. The method includes receiving a touch input from a touch detection unit, detecting touch characteristics according to the touch input, and generating events different from each other according to the detected touch characteristics.

The detecting of the touch characteristics may include detecting a contact region according to the touch input, and calculating an area of the contact region. The generating of the events different from each other may include generating events different from each other when the area of the contact region exceeds a first threshold value.

The method may further include calculating an eccentricity of the contact region. The generating of the events different from each other may include generating events different from each other when the eccentricity of the contact region exceeds a second threshold value.

The method may further include calculating an angle of the contact region. The generating of the events different from each other may include generating events different from each other according to the calculated angle.

The method may further include detecting a coordinate of the contact region, and calculating a variance of the detected coordinate. The generating of the events different from each other may include generating events different from each other when the calculated variance exceeds a third threshold value.

The method may further include calculating a movement amount of the detected coordinate. The generating of the events different from each other may include generating events different from each other when the movement amount of the coordinate exceeds a fourth threshold value.

The method may further include detecting the number of the touch input. The generating of the events different from each other may include generating events different from each other when the number of the touch input exceeds a fifth threshold value and the area of the contact region exceeds a sixth threshold value.

The method may further include detecting a coordinate of the contact region, and calculating a variance of the detected coordinate. The generating of the events different from each other may include generating events different from each other when the calculated variance exceeds a seventh threshold value.

According to another aspect of the present disclosure, there is provided an apparatus for providing a touch interface. The apparatus includes a touch detection unit configured to receive a touch input, and a control unit configured to detect touch characteristics according to the touch input and generate events different from each other according to the detected characteristics.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Generally, touch points between a touch detection unit and a user may correspond to the user's fingers. Here, the number of touch points may be singular or plural. However, an embodiment of the present disclosure will describe a touch input using a 'hand knife' that corresponds to a part of the hand from an end of the little finger up to the wrist and a 'palm' when a hand is unfolded, but using the fingers, and a method and apparatus for generating an event due to the touch input. In this specification, the touch point is regarded as an area of a contact point at which a user's hand contacts a touch screen.

Figure 1:
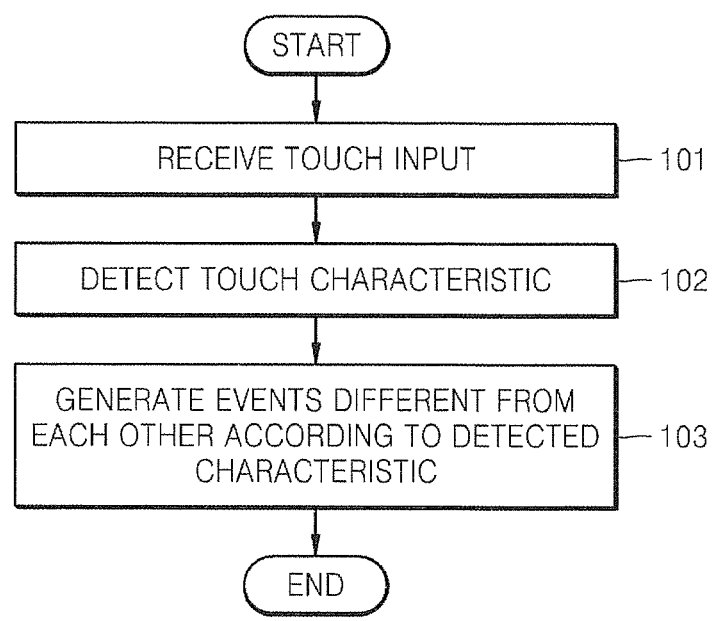
FIG. 1 is a flowchart illustrating a process of providing a touch interface according to an embodiment of the present disclosure.

FIG. 1 is a flowchart illustrating a process of providing a touch interface according to an embodiment of the present disclosure.

Referring to FIG. 1, in operation 101, a touch interface providing apparatus may receive touch input from a touch detection unit. Examples of the touch detection unit may include a touch screen and a touch pad. Then, the touch interface providing apparatus may determine at least one touch point based on the touch input. The touch point defines a touch contact area.

In operation 102, the touch interface providing apparatus detects the touch characteristics. In the embodiment of the present disclosure, examples of the touch characteristics may include a size of a touch point, an eccentricity of a touch point, an angle of a touch point, a variance of a coordinate included in the touch point, a movement amount of the coordinate included in the touch point when scrolled, and the number of the touch point. These touch characteristics will be described in detail with reference to FIG. 2. However, the present disclosure is not limited to the above-described examples. For example, various touch characteristics may be provided. The touch may be a single point touch regardless of a size or a multi-point touch. For the multi-point touch, the sum of the values of the touch characteristics may be used as necessary.

In operation 103, the touch interface providing apparatus may generate events different from each other according to the detected touch characteristics. The touch interface providing apparatus may generate events different from each other according to the size of the touch contact area, the eccentricity of the touch area, the angle of the touch input, the variance of the coordinate included in the touch area, the movement amount of the coordinate included in the touch area when scrolled, and the number of touches. In an embodiment of the present disclosure, events different from each other may be generated according to the hand knife touch or the palm touch.

Figure 2:
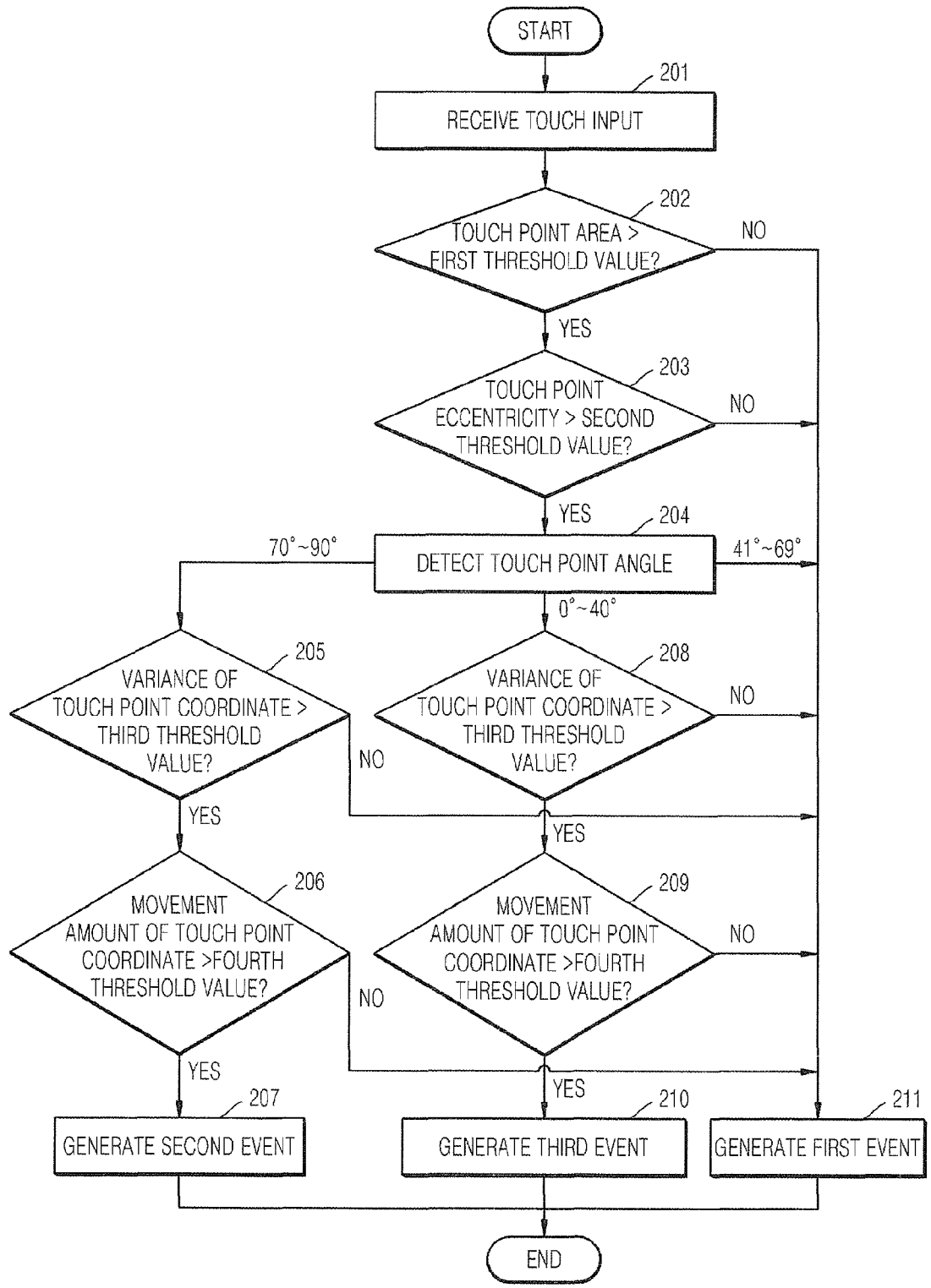
FIG. 2 is a flowchart illustrating a process of providing a touch interface according to another embodiment of the present disclosure.

FIG. 2 is a flowchart illustrating a process of providing a touch interface according to an embodiment of the present disclosure. FIG. 2 is a view for specifically explaining operations 102 and 103 of FIG. 1. FIG. 2 illustrates a process of providing a touch interface when the hand knife touch is inputted and recognized.

Referring to FIG. 2, since an operation 201 is equivalent to the operation 101 of FIG. 1, a detailed description will be omitted.

In operation 202, the touch interface providing apparatus calculates a size of an area of an inputted touch point. Here, the touch interface providing apparatus calculates the size of the area through a certain method after the touch point is determined. The present disclosure is not limited to the certain method. For the multi-point touch, areas of touch points are summed up.

Figure 3:
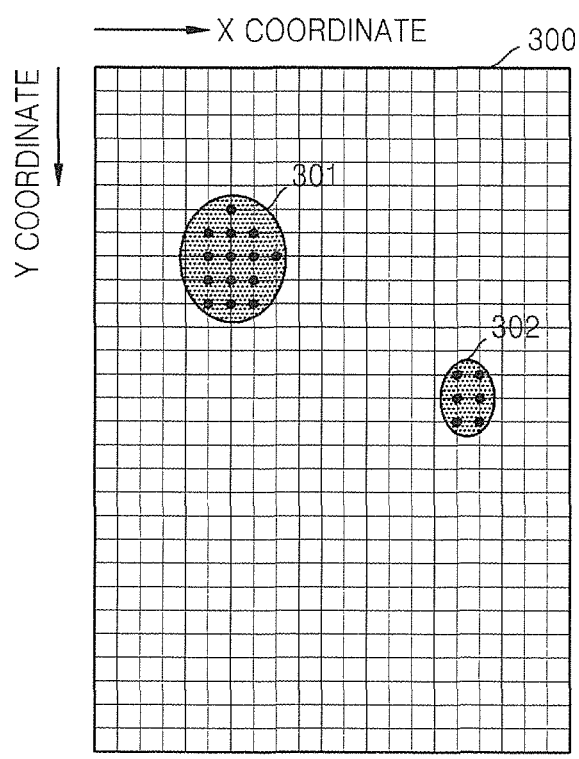
FIG. 3 is a coordinate diagram illustrating an example of an area of a touch point according to an embodiment of the present disclosure.

FIG. 3 is a coordinate diagram illustrating an example of an area of a touch point according to an embodiment of the present disclosure.

Referring to FIG. 3, a touch detection unit 300 allots the coordinate by a pixel unit. A horizontal axis represents an x-axis coordinate and a vertical axis represents a y-axis coordinate, based on a default structure of the touch detection unit 300. The touch interface providing apparatus calculates a size of an area after a first touch point 301 is determined. Fourteen coordinates exist in the first touch point 301. In this embodiment, the touch interface providing apparatus may calculate the size of the area, based on the coordinates included in the touch point. Also, the touch interface providing apparatus calculates a size of an area after a second touch point 302 is determined. Then, the touch interface providing apparatus sums the sizes of the areas of the first and second touch points 301 and 302.

Referring back to FIG. 2, after the size of the area is calculated, the process proceeds to an operation 203 when the area size of the touch point exceeds a first threshold value. Alternatively, the process proceeds to an operation 211.

In operation 203, the touch interface providing apparatus calculates an eccentricity of the touch point. The eccentricity is one of a number of constants that define a quadratic curve. An oval, a hyperbola, and a parabola may be determined according to whether the eccentricity is less or greater than 1 or equal to 1. That is, the eccentricity may become a standard for determining whether the quadratic curve is close to a circle. In an embodiment of the present disclosure, the eccentricity may be set to values of long radius/short radius, based on a central point of the area. The central point may be a center of gravity of the touch point. Alternatively, since the touch interface providing apparatus knows the coordinates of the touch point, the central point may be obtained based on the coordinates. The long radius represents the longest line among straight lines passing through the central point. Also, the short radius represents the shortest line.

Figure 4:
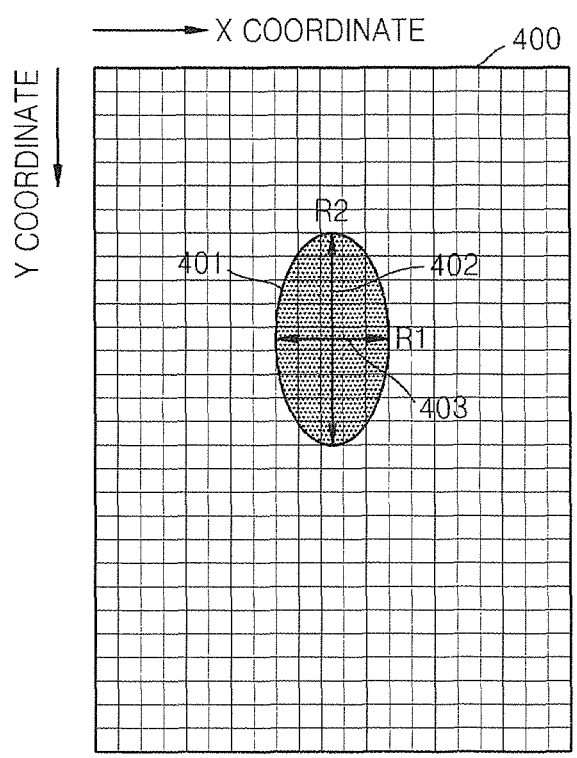
FIG. 4 is a coordinate diagram illustrating an example of an eccentricity of a touch point according to an embodiment of the present disclosure.

FIG. 4 is a coordinate diagram illustrating an example of an eccentricity of a touch point according to an embodiment of the present disclosure.

Referring to FIG. 4, a touch detection unit 400 allots the coordinate by a pixel unit. It is assumed that a horizontal axis represents an x-axis coordinate and a vertical axis represents a y-axis coordinate. The touch interface providing apparatus calculates an eccentricity after a third touch point 401 is determined. Referring to FIG. 4, a long radius is expressed by a reference symbol R2 402 and a short radius is expressed by a reference symbol R1 403. Thus, the eccentricity may be obtained from R2(402)/R1(403).

Referring again to FIG. 2, after the eccentricity is calculated, the process proceeds to an operation 204 when the eccentricity exceeds a second threshold value. Alternatively, the process proceeds to the operation 211.

In operation 204, the touch interface providing apparatus calculates an angle of the touch point. Here, the touch interface providing apparatus calculates the angle of the touch point after the touch point is determined. A method for calculating the angle of the touch point may be obtained by calculating an angle with respect to a straight line passing through a long radius of the touch point, based on a vertical axis of the touch detection unit.

Figure 5:
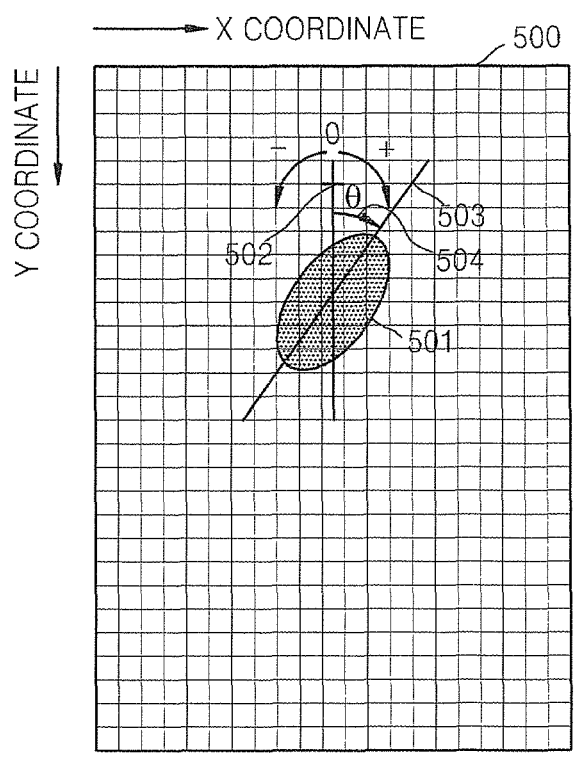
FIG. 5 is a coordinate diagram illustrating an example of an angle of a touch point according to an embodiment of the present disclosure.

FIG. 5 is a coordinate diagram illustrating an example of an angle of a touch point according to an embodiment of the present disclosure.

Referring to FIG. 5, a touch detection unit 500 allots the coordinate by a pixel unit. It is assumed that a horizontal axis represents an x-axis coordinate and a vertical axis represents a y-axis coordinate. The touch interface providing apparatus calculates an angle of the touch point after a fourth touch point 501 is determined. The touch interface providing apparatus calculates an angle 504 inclined between a reference line 502 passing through a central point in a direction parallel to the y-axis direction and a straight line 503 passing through a long radius. The touch interface providing apparatus may recognize an angle inclined toward a first quadrant and a fourth quadrant based on the reference line 502 as a positive (+) angle. Also, the touch interface providing apparatus may recognize an angle inclined toward a second quadrant and a third quadrant as a negative (−) angle. However, in an embodiment of the present disclosure, the touch interface providing apparatus may be set to recognize only an absolute value of an angle.

Referring again to FIG. 2, when an angle of the touch point is approximately 90°, the process proceeds to an operation 205. Alternatively, when an angle of the touch point is approximately 0°, the process proceeds to an operation 208. In another alternative, the process proceeds to the operation 211. According to an embodiment of the present disclosure, as shown in FIG. 2, it is seen that an angle of the touch point ranges from approximately 70° to approximately 90° when the process proceeds to the operation 205, an angle of the touch point range from approximately 0° to approximately 40° when the process proceeds to the operation 208, and an angle of the touch point ranges from approximately 41° to approximately 69° when the process proceeds to the operation 211. However, the above-described angles are described as an example. Thus, the present disclosure is not limited to the above-described angles. The above-described angles may be varied by a manufacture of the touch interface providing apparatus. However, when the process proceeds to the operation 205, the touch point should be close to a perpendicular angle based on the touch detection unit. Also, when the process proceeds to the operation 208, the touch point should be close to a horizontal angle based on the touch detection unit.

In operation 205, the touch interface providing apparatus calculates a variance of the touch point. Here, the touch interface providing apparatus calculates the variance of the touch point after the touch point is determined. The variance is a value that indicates a degree away from an average in the statistics. That is, a variance of any random variable is a numeral that indicates a degree for estimating how far the random variable is away from an expected value (average). The expected value represents a position of the random variable, and the variance represents how the random variable is spread. The variance is expressed as shown in the following Equation (1).

$$\sigma^2 = \frac{\sum_{i=1}^{N}(X_i - \mu)^2}{N}$$ [Eqn. 1]

Referring to Equation (1), $\sigma^2$ denotes a variance, $X_i$ denotes a value for obtaining the variance, and $\mu$ denotes an average. When applied to an embodiment of the present disclosure, $X_i$ denotes coordinates and $\mu$ denotes an average of the coordinates. For example, when coordinates (xi, yi) within the touch point are provided in six, e.g., (1,1), (2,1), (3,1), (1,2), (2,2), and (3,2), the average of an x-axis coordinate $\mu$ may equal 2, and the variance of the x-axis coordinate $\sigma^2$ may equal $((1-2)2+(2-2)2+(3-2)2+(1-2)2+(2-2)2+(3-2)2)/6=2/3$. Also, the average of a y-axis coordinate $\mu$ may equal 3/2, and the variance of the y-axis coordinate $\sigma^2$ may equal $((1-1.5)2+(1-1.5)2+(1-1.5)2+(2-1.5)2+(2-1.5)2+(2-1.5)2)/6=1/4$. In operation 206, since this process corresponds to a situation in which an angle of the touch point is approximately 90° in the operation 205, a coordinate of a vertical axis, i.e., a variance of the y-axis coordinate may be used as a reference point.

When a variance of the y-axis coordinate of the touch point exceeds a third threshold value, the process proceeds to the operation 206. When the variance of the y-axis coordinate of the touch point does not exceed the third threshold value, the process proceeds to the operation 211. Also, a condition in which a variance of the x-axis coordinate is less than a certain threshold value may be further added to a condition of the threshold value of the variance. In an embodiment of the present disclosure, the touch interface unit may confirm the number of touch point in a process between the operation 204 and the operation 205. When the number of the touch point is one, the operation 205 that is a process for obtaining a variance may be omitted to directly proceed to the operation 206.

In the operation 206, the touch interface providing apparatus calculates a movement amount of a touch point coordinate. When the user moves the touch point on the touch detection unit while contacting his/her hand on the current touch point, the touch interface providing apparatus calculates the movement amount of the touch point coordinate. In an embodiment of the present disclosure, the movement amount of the coordinate is calculated as a movement amount of a diagonal line by a Pythagorean theorem. The movement amount of the coordinate is expressed as shown in the following Equation (2).

$$SwDist^2 = SwDeltaX*SwDeltaX) + (SwDeltaY*SwDeltaX)$$ [Eqn. 2]

Referring to Equation (2), SwDist denotes a movement amount of the diagonal line, i.e., a movement amount of the coordinate, SwDeltaX denotes a variance of the x-axis coordinate, and SwDeltaY denotes a variance of the y-axis coordinate. For example, when the coordinate of the touch point is moved from coordinates (1,1), (2,1) to coordinates (1,2), (2,2), the movement amount of the coordinate may be a route 2.

When the movement amount of the touch point coordinate exceeds a fourth threshold value, the process proceeds to an operation 207. Alternatively, when the movement amount of the touch point coordinate does not exceed the fourth threshold value, the process proceeds to the operation 211.

If the conditions of the operations 201 to 206 are satisfied, this may correspond to a situation in which the hand knife contacts the touch detection unit to perform a swiping or sweeping operation in a horizontal direction, i.e., left or right direction. If the conditions of the operation 201 to 206 are satisfied, the touch interface providing apparatus may recognize that the hand knife vertically contacts the touch detection unit and the swiping or sweeping operation is performed in the left or right direction according to the operation 206. When the touch point is moved in a left or right direction, the y-axis coordinate is not substantially changed, and only the x-axis coordinate is changed.

Figure 6A:
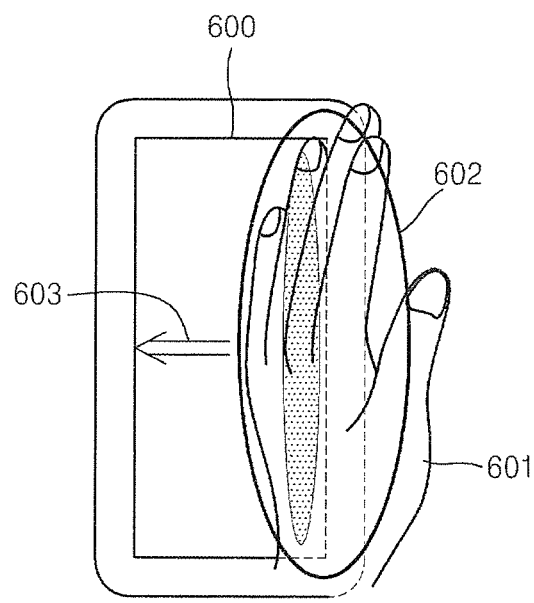
FIG. 6A is a view illustrating an example of a sweeping operation of a hand knife according to an embodiment of the present disclosure.

FIG. 6A is a view illustrating an example of a sweeping operation of a hand knife according to an embodiment of the present disclosure.

Referring to FIG. 6A, the conditions of the operation 201 to operation 206 are satisfied, and also, the hand knife of a user's hand (601) contacts (a portion contacting a shaded portion within a reference numeral 602) the touch detection unit 600 and is moved in the left direction.

In operation 207, the touch interface providing apparatus generates a second event. That is, the touch interface providing apparatus recognizing the swiping or sweeping operation in the left or right direction of the hand knife generates the second event corresponding to the above-described operation. The swiping or sweeping operation represents an operation for laterally pushing a screen. The second event represents an operation reacting with respect to the swiping or sweeping operation in the left or right direction. A specific example will be described with reference to FIGS. 7 to 9, which will be described later.

In operation 204, when an angle of the touch point is approximately 0°, the process proceeds to an operation 208. In the operation 208, the touch interface providing apparatus calculates a variance. When a variance of the x-axis coordinate of the touch point exceeds the third threshold value, the process proceeds to an operation 209. Alternatively, when the of the x-axis coordinate of the touch point does not exceed the third threshold value, the process proceeds to the operation 211. Also, a condition in which a variance of the y-axis coordinate is less than a certain threshold value may be further added to a condition of the threshold value of the variance. In operation 205, the y-axis coordinate that is a vertical axis is used as a reference point. Alternatively, since the operation 208 corresponds to a situation in which an angle of the touch point is approximately 0°, a coordinate of a horizontal axis, a variance of the x-axis coordinate may be used as a reference point. Also, although it is assumed that the threshold values are equal to each other in the operations 205 and 208, the threshold values may be different from each other in the operations 205 and 208 because a display may have a rectangular shape, and the touch detection unit has left and right lengths different from each other even though the hand knife contacts the touch detection unit, thereby causing contact lengths different from each other.

In an embodiment of the present disclosure, the touch interface unit may confirm the number of the touch points in a process between the operation 204 and the operation 208. When the number of the touch point is one, the operation 208 that is a process for obtaining a variance may be omitted to directly proceed to the operation 209.

In the operation 209, the touch interface providing apparatus calculates a movement amount of the touch point. When the movement amount of the touch point coordinate exceeds a fourth threshold value, the process proceeds to an operation 210. Alternatively, when the movement amount of the touch point coordinate does not exceed the fourth threshold value, the process proceeds to the operation 211. Also, although it is assumed that the threshold values are equal to each other in the operations 206 and 209, the threshold values may be different from each other in the operations 206 and 209 because a display may have a rectangular shape.

If the conditions of the operations 201 to 204, 208, and 209 are satisfied, this may correspond to a situation in which the hand knife contacts the touch detection unit to perform a swiping or sweeping operation in a vertical direction, i.e., upper or lower direction. If the conditions of the operation 201 to 204 and 208 are satisfied, the touch interface providing apparatus may recognize that the hand knife horizontally contacts the touch detection unit and the swiping or sweeping operation is performed in the upper or lower direction according to the operation 209. When the touch point is moved in upper or lower direction, the x-axis coordinate is not substantially changed, and only the y-axis coordinate is changed.

Figure 6B:
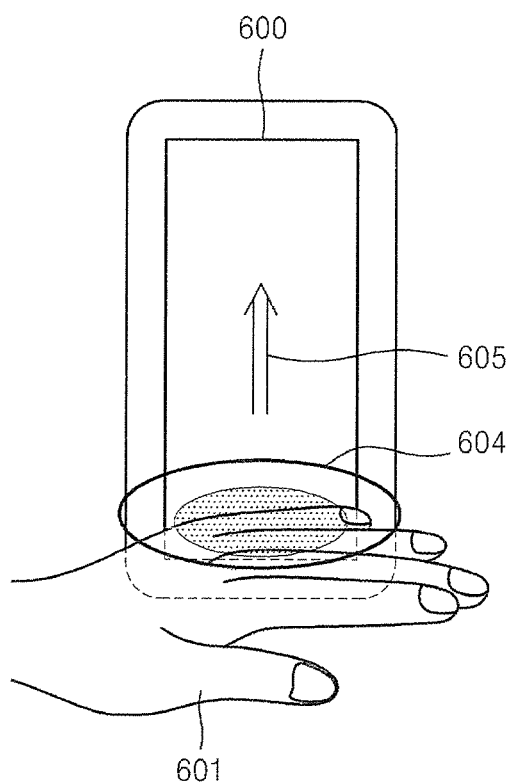
FIG. 6B is a view illustrating an example of a sweeping operation of a hand knife according to another embodiment of the present disclosure.

FIG. 6B is a view illustrating an example of a sweeping operation of a hand knife according to another embodiment of the present disclosure.

Referring to FIG. 6B, the conditions of the operations 201 to 204, 206, and 209 are satisfied, and also, the hand knife of a user's hand (601) contacts (i.e., a portion contacting a shaded portion within a reference numeral 602) the touch detection unit 600 and is moved in the upper direction 605.

In operation 210, the touch interface providing apparatus generates a third event. That is, the touch interface providing apparatus recognizes the swiping or sweeping operation in the upper or lower direction of the hand knife and generates the third event corresponding to the above-described operation. The swiping or sweeping operation represents an operation for laterally pushing a screen. The third event represents an operation reacting with respect to the swiping or sweeping operation in the upper or lower direction. A specific example will be described with reference to FIGS. 7 to 9 that will be described later.

In operation 211, touch interface providing apparatus generates a first event. The first event may be an event corresponding to a general finger touch. When the touch point gets out of a certain angle and thus the swiping or sweeping operation in one direction is not recognized, the first event may correspond to an event assumed as the general finger touch.

Referring to FIG. 2, although the second or third event is generated when each of a series of processes is satisfied, the present disclosure is not limited thereto. For example, the hand knife may be recognized only in the operation 202 and 204. The processes and combinations thereof in FIG. 2 may be varied according to capacities of the touch detection unit or the touch interface providing apparatus.

Figure 7:
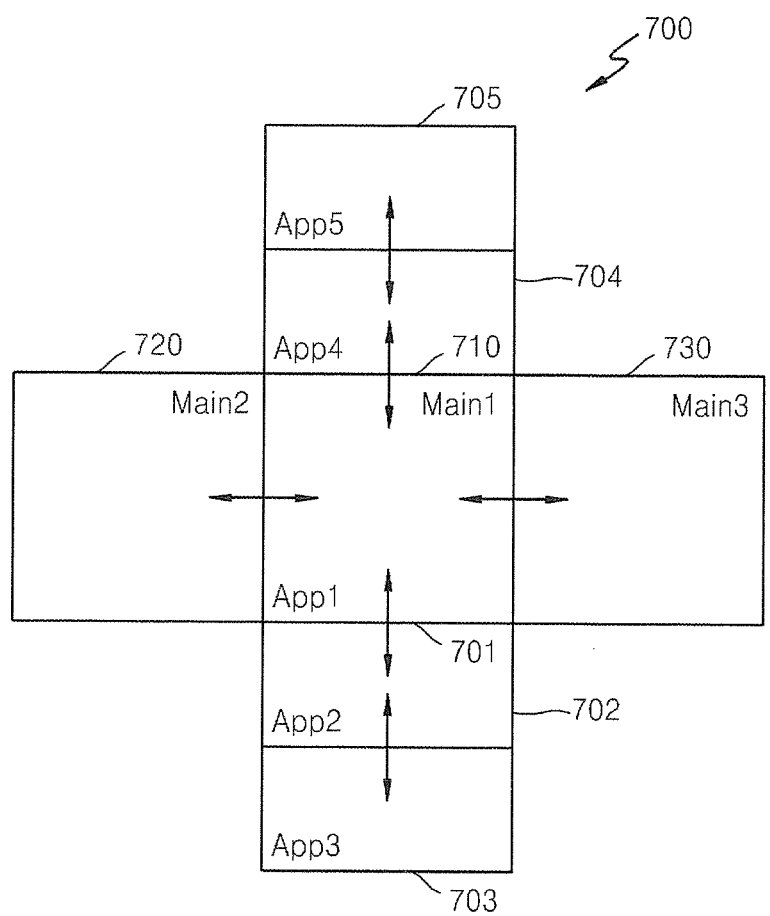
FIG. 7 is a view illustrating an example of a structure of an interface provided by a sweeping operation of a hand knife touch according to an embodiment of the present disclosure.

FIG. 7 is a view illustrating an example of a structure 700 of an interface provided by a sweeping operation of a hand knife contact according to an embodiment of the present disclosure.

Referring to FIG. 7, the touch interface providing apparatus may provide interfaces 701 to 705 according to the vertical sweeping operation as an example of the third event. That is, when the hand knife horizontally contacts the touch detection unit to vertically perform the sweeping operation, the interface providing apparatus provides interfaces 701 to 705 according to the vertical sweeping operation. The central interface is an interface provided into the current display. For example, when an upward sweeping operation is recognized, the touch interface providing apparatus provides the lower interface 702 to the central interface 701. And conversely, when a downward sweeping operation is recognized, the touch interface providing apparatus provides the upper interface 704. In FIG. 7, an interface corresponding to the third event is an interface for converting an application. For example, the vertical sweeping operation may enable an application different from a list, a page, and a status bar to be scrolled.

The touch interface providing apparatus provides interfaces 710 to 730 according to the vertical sweeping operation as an example of the second event. That is, when the hand knife vertically contacts the touch detection unit to horizontally perform the sweeping operation, the interface providing apparatus provides interfaces 710 to 730 according to the horizontal sweeping operation. The central interface 710 is an interface provided into the current display. For example, when the sweeping operation is recognized in a right direction, the touch interface providing apparatus provides the left interface 720 to the central interface 710. And conversely, when the sweeping operation is recognized in a left direction, the touch interface providing apparatus provides the right interface 730. In FIG. 7, an interface corresponding to the second event is an interface for converting a menu. For example, the vertical sweeping operation may realize a conversion menu having a new cabinet in which desired applications and contents are stored.

Figure 8:
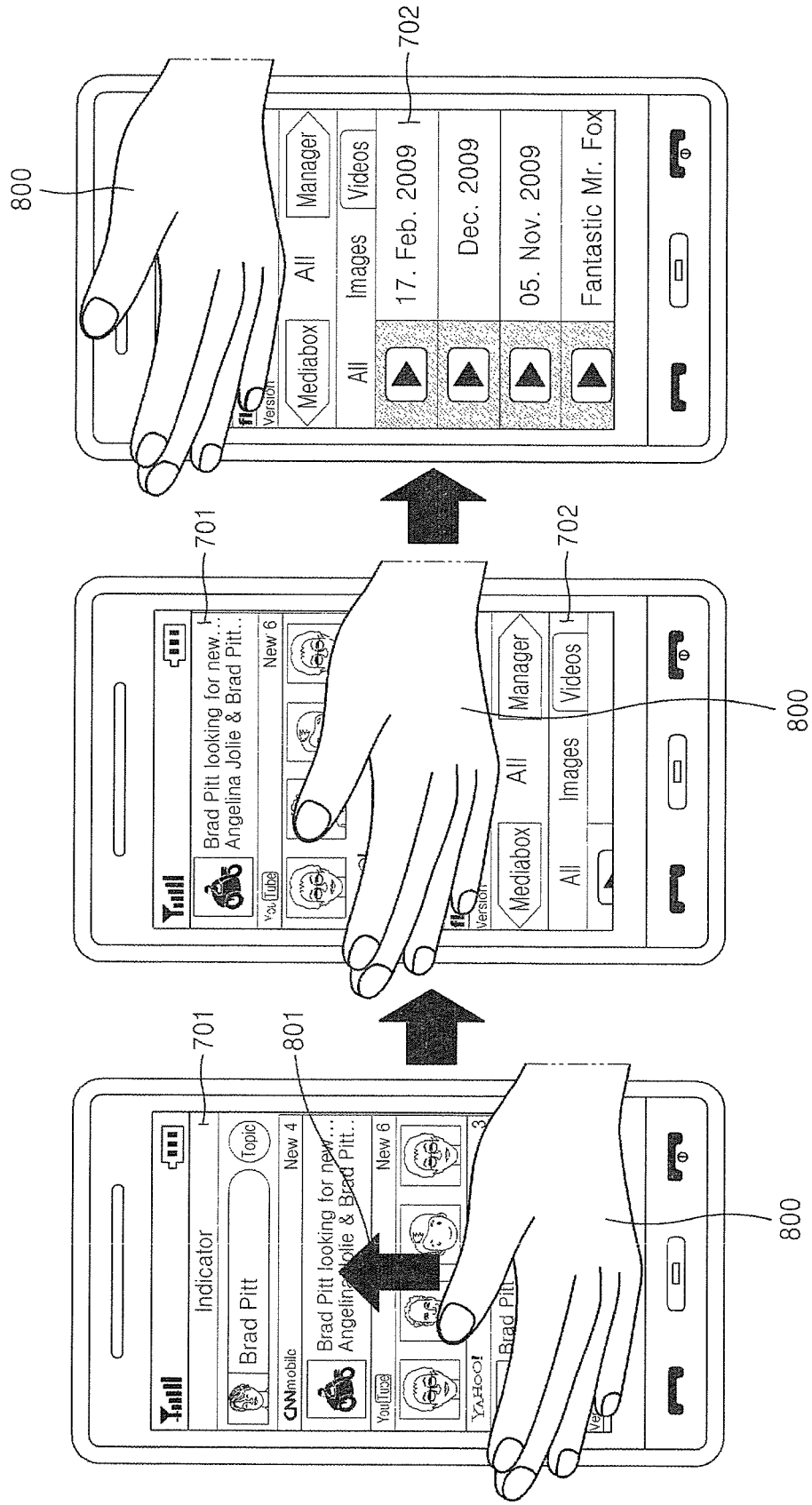
FIGS. 8 and 9 are views illustrating examples of an interface provided by a sweeping operation of hand knife touch according to an embodiment of the present disclosure.
Figure 9:
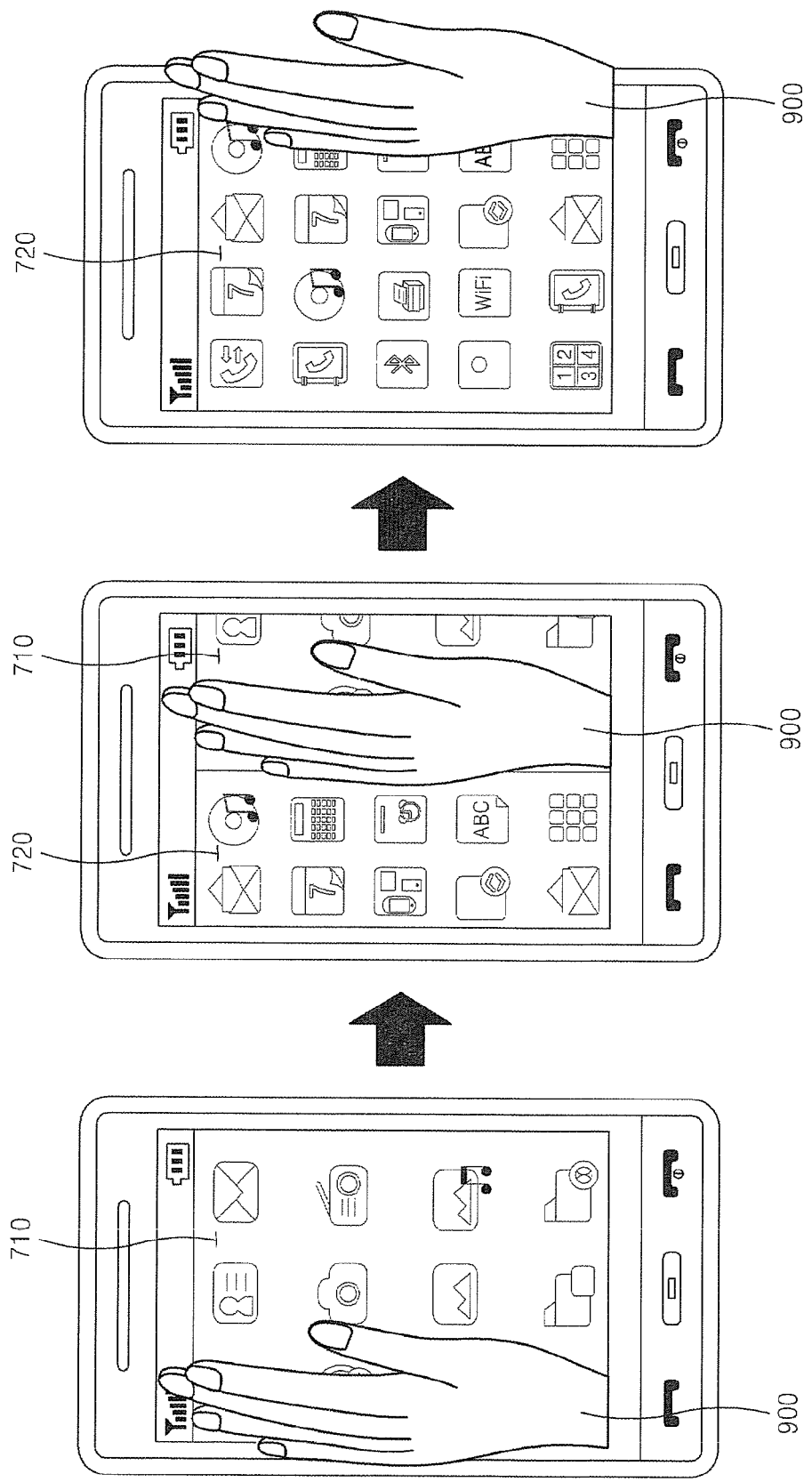

FIGS. 8 and 9 are views illustrating examples of an interface provided by a sweeping operation of hand knife touch according to an embodiment of the present disclosure.

Referring to FIG. 8, when a hand knife of a user's hand 800 contacts the touch detection unit from a downward direction to a horizontal direction to perform the sweeping operation in an upward direction 801, the current application 701 is converted into an application 702 allotted in a lower side of the current application 701 in the structure of FIG. 7.

Referring to FIG. 9, when a hand knife of a user's hand 900 contacts the touch detection unit from a left direction to a vertical direction to perform the sweeping operation in a right direction, the current menu 710 is converted into a menu 720 allotted in a left side of the current menu 710 in the structure of FIG. 7.

Figure 10:
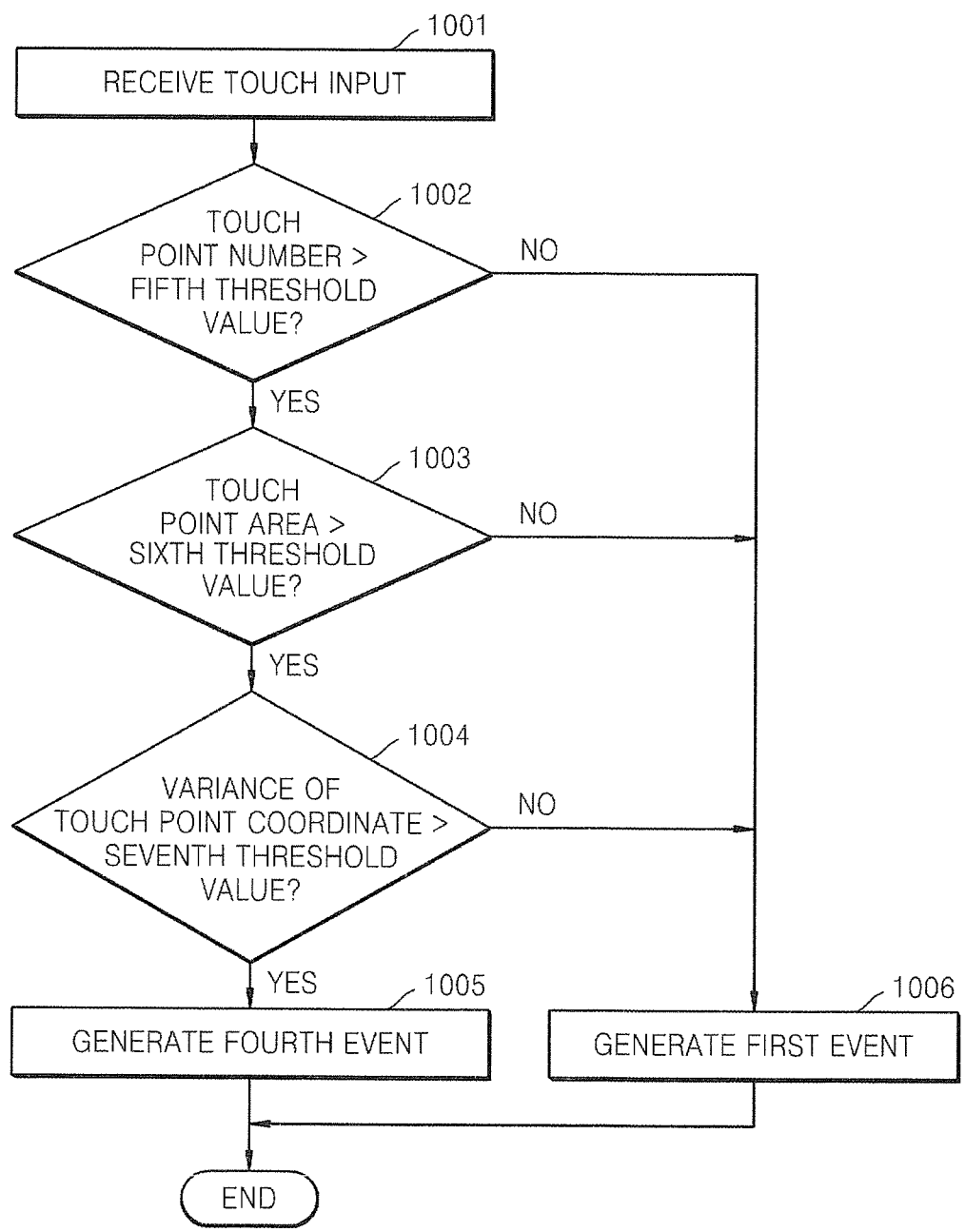
FIG. 10 is a flowchart illustrating a process of providing a touch interface according to another embodiment of the present disclosure.

FIG. 10 is a flowchart illustrating a process of providing a touch interface according to another embodiment of the present disclosure. FIG. 10 is a view for specifically explaining operations 102 and 103 of FIG. 1. FIG. 10 is a flowchart illustrating a process of providing a touch interface when the palm touch is inputted and recognized.

Referring to FIG. 10, since an operation 1001 is equivalent to the operation 101 of FIG. 1, a detailed description will be omitted.

In operation 1002, the touch interface providing apparatus recognizes the number of touch points.

When the number of touch points exceeds a fifth threshold value, the process proceeds to an operation 1003. Alternatively, when the number of touch points does not exceed the fifth threshold value, the process proceeds to the operation 1006.

In operation 1003, the touch interface providing apparatus calculate a size of an area of the inputted touch point. Here, the touch interface providing apparatus calculates the size of the area through a certain method after the touch point is decided. For the palm touch, areas of the touch points are summed up because a multi-touch input occurs. After the size of the area is calculated, the process proceeds to an operation 1004 when the area size of the touch point exceeds a sixth threshold value. Alternatively, the process proceeds to an operation 1006. Unlike the hand knife touch of FIG. 2, the sixth threshold value may be greater than the first threshold value.

In operation 1004, the touch interface providing apparatus calculates a variance of the touch point. Here, the touch interface providing apparatus calculates the variance of the touch point after the touch point is determined. When variances of the x-axis and y-axis coordinates of the touch point exceed a seventh threshold value, the process proceeds to the operation 1005. When the variances of the x-axis and y-axis coordinates of the touch point do not exceed the third threshold value, the process proceeds to an operation 1006. Unlike the operation 205 and 208, the variances of the x-axis and y-axis coordinates should exceed a certain threshold value in operation 1004.

If the conditions of the operations 1001 to 1004 are satisfied, this corresponds to a state in which the palm contacts the touch detection unit to perform an operation.

Figure 11:
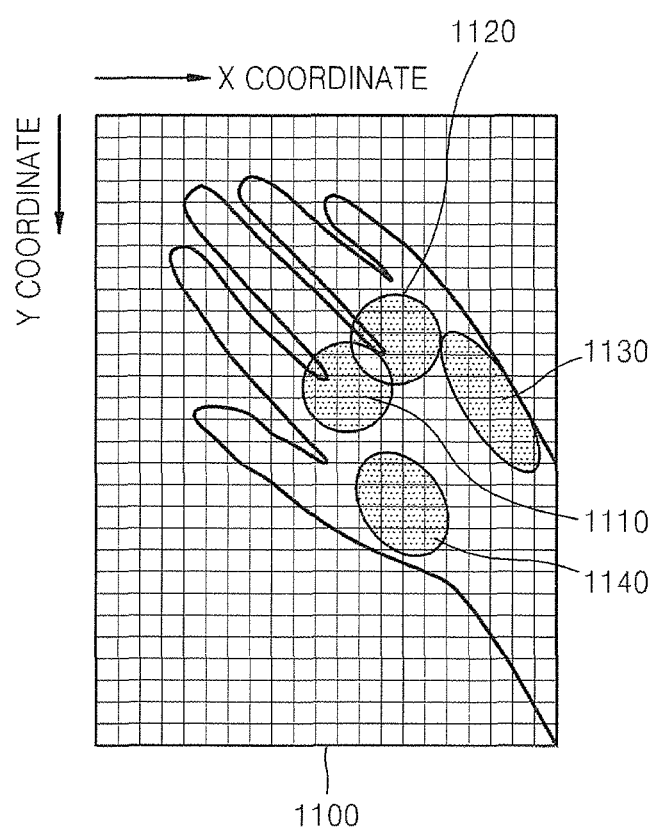
FIG. 11 is a coordinate diagram illustrating an example of the number of touch points according to an embodiment of the present disclosure.

FIG. 11 is a coordinate diagram illustrating an example of the number of touch points according to an embodiment of the present disclosure.

Referring to FIG. 11, a touch detection unit 1100 allots the coordinate by a pixel unit. A horizontal axis represents an x-coordinate and a vertical axis represents a y-coordinate, based on a default structure of the touch detection unit 1100. Here, the touch interface providing apparatus recognizes the number of the touch points through a touch detection unit 1100. Four touch points 1110 to 1140 are illustrated in FIG. 11. Generally, when the palm touch is performed, a plurality of touch points may be generated in the touch detection unit 1100 because a human's hand has curved portions.

Figure 12:
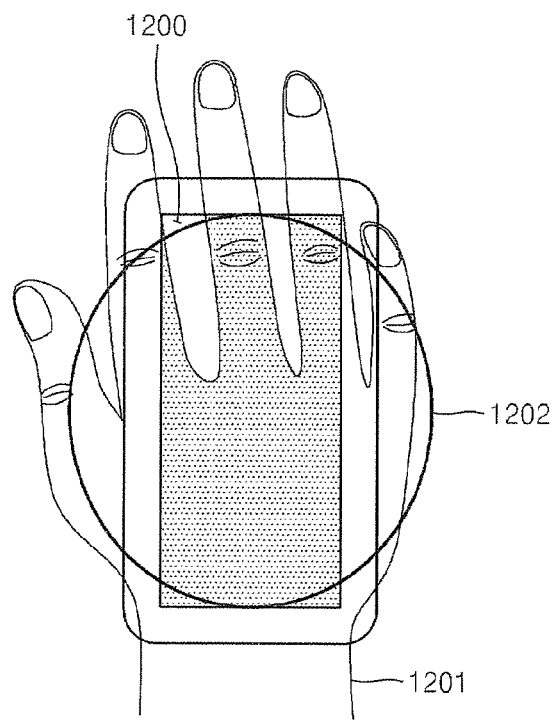
FIG. 12 is a view illustrating an example of a palm touch operation according to an embodiment of the present disclosure.

FIG. 12 is a view illustrating an example of a palm touch operation according to an embodiment of the present disclosure.

Referring to FIG. 12, the conditions of the operations 1001 to 1004 are satisfied, and also, the hand knife of a user's hand (1200) contacts (i.e., a portion contacting a shaded portion within a reference numeral 1202) the touch detection unit 1201.

In operation 1005, the touch interface providing apparatus generates a fourth event. That is, the touch interface providing apparatus recognizes the contact of the hand knife and generates the fourth event corresponding to the above-described operation. The fourth event represents an operation reacting with respect to the touch of the palm. For example, the fourth event may be an event for ending the current executing application. Also, when the touch interface providing apparatus is increased in a mobile device, the fourth event may be an event for ending a call. When the user ends or cancels a certain operating function, the fourth event may provide a real feedback to the user by actually covering the current screen. This may be randomly set by the manufacturer or user.

Since an operation 1006 is equal to the operation 211, their duplicated descriptions will be omitted.

Figure 13:
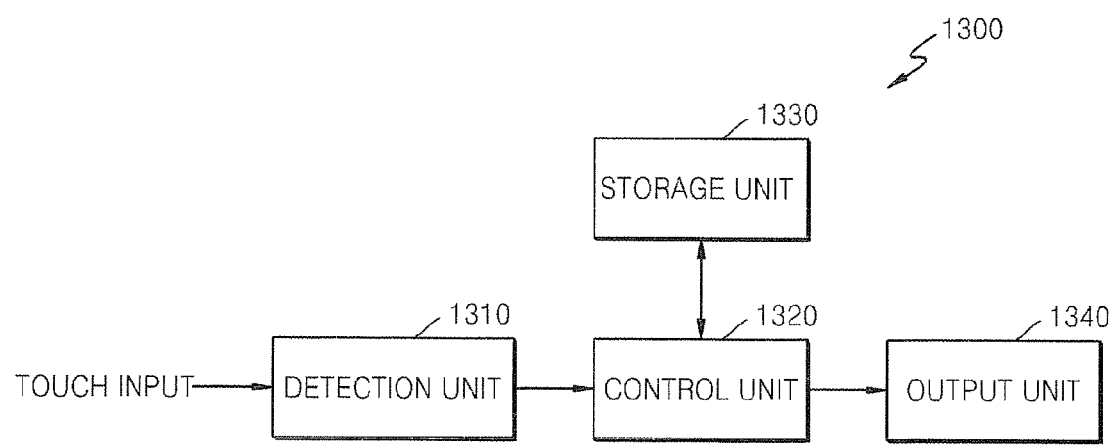
FIG. 13 is a block diagram illustrating an apparatus for providing a touch interface according to an embodiment.

FIG. 13 is a block diagram illustrating an apparatus for providing a touch interface according to an embodiment.

A touch interface providing apparatus 1300 includes a touch detection unit 1310, a control unit 1320, a storage unit 1330, and an output unit 1340.

The touch detection unit 1310 represents a touch detection device. Thus, the touch detection unit 1310 may include a touch screen or a touch pad. The touch screen is a touch detection surface for receiving a user's input based on haptic contact or tactile contact. The touch screen may have a capacitive technology, a resistive technology, an infrared technology, and a surface acoustic wave technology as well as a proximity sensor array. The touch screen may include other components for determining one or more contact points with the touch screen. In a general touch detection unit, a user's interface is based on finger-based contact and gesture. However, the user's interface according to the embodiment of the present disclosure may be based on a hand knife or palm-based contact and gesture. The touch pad may be a touch detection region of the device. Unlike the touch screen, the touch pad does not display a visual output. The touch pad may be separated from the touch screen or a touch detection surface extending from the touch detection surface of the touch screen.

The touch detection unit 1310 may be integrated with the display device or separated from the display device as an individual component. In FIG. 13, the display device may be the output unit 1340.

The touch detection unit 1310 receives a user's touch input.

The output unit 1340 may be a liquid crystal display (LCD) (e.g., an active matrix, a passive matrix, and the like). Alternatively, the output unit 1340 may be a monitor such as a single color display, a color graphics adapter (CGA) display, an enhanced graphics adapter (EGA) display, a variable-graphics-array (VGA) display, a super VGA display, a cathode ray tube (CRT), and the like. The output 1340 may correspond to a plasma display or a display which is realized by an electronic link.

The control unit 1320 detects touch characteristics. The control unit 1320 determines at least one touch point based on the touch input. The touch point defines a touch contact area.

In the embodiment of the present disclosure, examples of the touch characteristics may include a size of a touch contact point, an eccentricity of a touch point, an angle of a touch point, a dispersion value of a coordinate included in the touch point, an movement amount of the coordinate included in the touch point when scrolled, and the number of the touch point. However, the present disclosure is not limited to the above-described examples. For example, various touch characteristics may be provided. The touch may be a single point touch regardless of a size or a multi-point touch. For the multi-point touch, the sum of the values of the touch characteristics may be used as necessary.

Thereafter, the control unit 1320 generates events different from each other according to the detected touch characteristics. The control unit 1320 may generate events different from each other according to the size of the touch contact area, the eccentricity of the touch area, the angle of the touch input, the dispersion value of the coordinate included in the touch area, the movement amount of the coordinate included in the touch area when scrolled, and the number of touches. In an embodiment of the present disclosure, the control unit 1320 generates events different from each other according to the hand knife touch or the palm touch.

Hereinafter, an operation of the control unit according to the touch input will be described. An embodiment in which the hand knife touch is recognized and thus an event according to the hand knife touch is generated will be described.

The control unit 1320 calculates a size of an area of a touch point inputted into a touch detection unit 1310. The control unit 1320 calculates the size of the area through a predetermined method after the touch point is determined. The control unit 1320 may calculate the size of the area, based on the coordinates included in the touch point. The present disclosure is not limited to the predetermined method. For the multi-point touch, the control unit 1320 sums areas of the touch points.

The control unit 1320 calculates an eccentricity of the touch point. The eccentricity is one of the constants that define a quadratic curve. An oval, a hyperbola, and a parabola may be determined according to whether the eccentricity is less or greater than 1 or equal to 1. That is, the eccentricity may be used for determining whether the quadratic curve is close to a circle. In an embodiment of the present disclosure, the eccentricity may be set to values of long radius/short radius, based on a central point of the area. The central point may be a center of gravity of the touch point. Alternatively, since the touch interface providing apparatus knows the coordinates of the touch point, the central point may be obtained based on the coordinates. The long radius represents the longest line among straight lines passing through the central point. Also, the short radius represents the shortest line.

The control unit 1320 calculates an angle of the touch point. The control unit 1320 calculates the angle of the touch point after the touch point is determined. A method for calculating the angle of the touch point includes calculating an angle with respect to a straight line passing through a long radius of the touch point, based on a vertical axis of the touch detection unit.

When an angle of the touch point is approximately 90° or 0°, the control unit 1320 calculates a variance of the touch point. Here, the touch interface providing apparatus calculates the variance value of the touch point after the touch point is determined. The variance is a value that indicates a degree away from an average in the statistics. That is, a variance of any random variable is a numeral that indicates a degree for estimating how the random variable is away from an expected value (average). The expected value represents a position of the random variable, and the variance represents how the random variable is spread.

When the size of the area of the touch point exceeds a first threshold value stored in the storage unit 1330, the eccentricity exceeds a second threshold value stored in the storage unit 1330, the angle of the touch point is approximately 90°, and a variance of a y-axis coordinate of the touch point exceeds a third threshold value (a condition in which a variance of the y-axis coordinate is less than a certain threshold value may be further added to a condition of the threshold value of the variance), the control unit 1320 may detect that the touch point of the hand knife vertically contacts the touch detection unit. Also, when the angle of the touch point is approximately 0°, when a variance of the x-axis coordinate of the touch point exceeds a third threshold value stored in the storage unit 1330 (a condition in which a variance of the y-axis coordinate is less than a certain threshold value may be further added to a condition of the threshold value of the variance), it is detected that the touch point of the hand knife horizontally contacts the touch detection unit. Although it is assumed that the third threshold values according to the angle are equal to each other, the threshold values may be different from each other because the touch detection unit 310 has a rectangular shape, and has left and right lengths different from each other to cause contact lengths different from each other.

The control unit 1320 calculates a movement amount of a touch point coordinate. When the user moves the touch point on the touch detection unit while contacting his/her hand on the current touch point, the control unit 1320 calculates the movement amount of the touch point coordinate. In an embodiment of the present disclosure, the movement amount of the coordinate is calculated as a movement amount of a diagonal line according to the Pythagorean Theorem.

When the movement amount of the touch point coordinate exceeds a fourth threshold value stored in the storage unit 1330, the control unit 1320 may generate events different from each other according to the vertical and horizontal contact of the touch point of the hand knife. Also, although it is assumed that the fourth threshold values are equal to each other, the fourth threshold values may be different from each other because a display has a rectangular shape. When the movement amount of the touch point coordinate exceeds the fourth threshold value, this may correspond to a situation in which the hand knife contacts the touch detection unit to perform a swiping or sweeping operation in a left or right, or upper or lower direction. If it is recognized that the hand knife vertically contacts the touch detection unit 1310, it may be recognized that the swiping or sweeping operation is performed in a left or right direction. Also, if it is recognized that the hand knife horizontally contacts the touch detection unit 1310, the control unit 1320 may recognize that the swiping or sweeping operation is performed in an upper or lower direction.

When the swiping or sweeping operation is performed in the left or right direction, the control unit 1320 generates a second event. When the swiping or sweeping operation is performed in the upper or lower direction, the control unit 1320 generates a third event. Since the examples of the second and third events according to the vertical and horizontal swiping or sweeping are illustrated in FIGS. 7 to 9, their descriptions will be omitted here. Also, it is unnecessary to allow the conditions to exceed the threshold value. A combination of the conditions for satisfying the threshold value may be varied according to capacities of the touch detection unit or the touch interface providing apparatus.

An embodiment in which the palm touch is recognized and thus an event according to the palm touch is generated will be described.

The control unit 1320 recognizes the number of touch points and calculates a size of an area of the touch points. Also, the control unit 1320 calculates a variance of the touch points.

When the number of touch points exceeds a fifth threshold value stored in the storage unit 1330, the size of the area exceeds a sixth threshold value stored in the storage unit 1330, and variances of the x-axis and y-axis coordinates of the touch point exceed a seventh threshold value stored in the storage unit 1330, the control unit 1320 recognizes that the palm contacts the touch detection unit to generate a fourth event. For example, the fourth event may be an event for ending the current executing application. Also, when the touch interface providing apparatus 1300 is increased in a mobile device, the fourth event may be an event for ending a call. When the user ends or cancels a certain operating function, the fourth event may provide a real feedback to the user by actually covering the current screen. This may be randomly set by the manufacturer or user.

Also, it is unnecessary to allow the conditions to exceed the threshold value. A combination of the conditions for satisfying the threshold value may be varied according to capacities of the touch detection unit or the touch interface providing apparatus.

As described above, a sensing information providing method, a sensing providing method, and a method for receiving sensing information from a sensing information providing apparatus to allow the sensing providing apparatus to provide the sensing information may be realized using codes readable by a computer in a recording medium. The computer readable recording medium is any data storage medium that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for realizing the disk management method can be easily construed by programmers skilled in the art to which the present disclosure pertains.

The preferred embodiments should be considered in descriptive sense only and not for purposes of limitation. Therefore, the scope of the invention is defined not by the detailed description of the disclosure but by the appended claims, and all differences within the scope will be construed as being included in the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a touch interface, the method comprising:
    receiving a touch input from a touch detection unit in a display, wherein the display displays a screen including a plurality of objects displayed on a main display area;
    determining whether the touch input is a finger touch or a hand knife touch by an edge of a palm of a hand substantially vertically standing on the screen, based on a size and shape of a contact region of the touch input;
    receiving a swipe gesture continued from the touch input;
    if the touch input is the finger touch, performing a first operation corresponding to the swipe gesture of the finger touch; and
    if the touch input is the hand knife touch by the edge of the palm of the hand substantially vertically standing on the screen, performing a second operation corresponding to the swipe gesture of the hand knife touch by the edge of the palm while the hand substantially vertically stands on the screen,
    wherein the first operation by the finger touch affects only a portion of the plurality of objects displayed on the main display area, and the second operation by the hand knife touch affects the screen including all of the plurality of objects displayed on the main display area regardless the contact region of the touch input.

2. The method of claim 1, wherein the second operation is further based on when an eccentricity of the contact region is greater than a second threshold value, and an angle of the contact region is within a first range of angle values.

3. The method of claim 2, further comprising:
calculating the eccentricity of the contact region.

4. The method of claim 3, further comprising:
calculating the angle of the contact region.

5. The method of claim 4, further comprising:
detecting a coordinate of the contact region; and
calculating a variance of the detected coordinate, wherein performing the second operation comprises generating the second operation upon a determination that the calculated variance exceeds a third threshold value.

6. The method of claim 5, further comprising:
calculating a movement amount of the detected coordinate; and
generating a third operation upon a determination that the calculated variance exceeds a third threshold value and the calculated movement amount exceeds a fourth threshold value.

7. The method of claim 2, further comprising:
detecting a number of touch points associated with the touch input; and
generating a fourth operation upon a determination that a number of the touch input exceeds a fifth threshold value and an area of the contact region exceeds a sixth threshold value greater than a first threshold value for the finger touch.

8. The method of claim 7, further comprising:
detecting a coordinate of the contact region; and
calculating a variance of the detected coordinate,
wherein the generating of the fourth operation comprises generating the fourth operation upon a determination that the calculated variance exceeds a seventh threshold value.

9. An apparatus for providing a touch interface, the apparatus comprising:
a touch detection unit configured to receive a touch input and receive a swipe gesture continued from the touch input in a display, wherein the display displays a screen including a plurality of objects displayed on a main display area; and
a control unit configured to:
determine whether the touch input is a finger touch or a knife hand touch by an edge of a palm of a hand substantially vertically standing on the screen, based on a size and shape of a contact region of the touch input;
if the touch input is the finger touch, perform a first operation corresponding to the swipe gesture of the finger touch; and
if the touch input is the hand knife touch by the edge of the palm of the hand substantially vertically standing on the screen, perform a second operation corresponding to the swipe gesture of the hand knife touch by the edge of the palm while the hand substantially vertically stands on the screen,
wherein the first operation by the finger touch affects only a portion of the plurality of objects displayed on the main display area, and the second operation by the hand knife touch affects the screen including all of the plurality of objects displayed on the main display area regardless the contact region of the touch input.

10. The apparatus of claim 9, wherein the second operation is further based on when an eccentricity of the contact region is greater than a second threshold value, and an angle of the contact region is within a first range of angle values.

11. The apparatus of claim 10, wherein the control unit is configured to calculate the eccentricity of the contact region.

12. The apparatus of claim 11, wherein the control unit is configured to calculate the angle of the contact region based on a certain direction.

13. The apparatus of claim 12, wherein the control unit is configured to detect a coordinate of the contact region to calculate a variance of the detected coordinate, and generate the second operation upon a determination that the calculated variance exceeds a third threshold value.

14. The apparatus of claim 13, wherein the control unit is configured to calculate a movement amount of the detected coordinate, and generate a third operation upon a determination that the calculated variance exceeds a third threshold value and the calculated movement amount exceeds a fourth threshold value.

15. The apparatus of claim 10, wherein the control unit is configured to detect a number of touch points associated with the touch input, and generate a fourth operation upon a determination that the number of the touch inputs exceeds a fifth threshold value and an area of the contact region exceeds a sixth threshold value greater than a first threshold value.

16. The apparatus of claim 15, wherein the control unit is configured to detect a coordinate of the contact region to calculate a variance of the detected coordinate, and generate a fourth operation upon a determination that the calculated variance exceeds a seventh threshold value.

17. A non-transitory computer-readable storage medium encoded with executable instructions that when executed cause one or more processors to:
receive a touch input from a touch detection unit in a display, wherein the display displays a screen including a plurality of objects displayed on a main display area;
determine whether the touch input is a finger touch or a hand knife touch by an edge of a palm of a hand substantially vertically standing on the screen, based on a size and shape of a contact region of the touch input;
receive a swipe gesture continued from the touch input;
if the touch input is the finger touch, perform a first operation corresponding to the swipe gesture of the finger touch; and
if the touch input is the hand knife touch by the edge of the palm of the hand substantially vertically standing on the screen, perform a second operation corresponding to the swipe gesture of the hand knife touch by the edge of the palm while the hand substantially vertically stands on the screen,
wherein the first operation by the finger touch affects only a portion of the plurality of objects displayed on the main display area, and the second operation by the hand knife touch affects the screen including all of the plurality of objects displayed on the main display area regardless the contact region of the touch input.

18. The non-transitory computer-readable storage medium of claim 17, wherein the second operation is further based on when an eccentricity of the contact region is greater than a second threshold value, and an angle of the contact region is within a first range of angle values.

19. The non-transitory computer-readable storage medium of claim 18, wherein the executable instructions further cause the one or more processors to perform:
calculating the eccentricity of the contact region; and
calculating the angle of the contact region,
wherein the executable instructions cause the one or processors to generate the second operation by generating the second operation according to the calculated angle upon determination that the eccentricity of the contact region exceeds a second threshold value.

20. The non-transitory computer-readable storage medium of claim 19, wherein the executable instructions further cause the one or more processors to perform:
- detecting a coordinate of the contact region;
- calculating a variance of the detected coordinate;
- calculating a movement amount of the detected coordinate; and
- generating a third operation upon a determination that the calculated variance exceeds a third threshold value and the calculated movement amount exceeds a fourth threshold value.

21. The method of claim 6, wherein the third operation is generated upon a determination that the angle of the contact region is within a second range of angle values different than a first range of angle values.

22. The method of claim 1, further comprising:
- generating the first operation upon a determination that an eccentricity of the contact region is less than a second threshold value.

23. The apparatus of claim 14, wherein the control unit is configured to generate the third operation upon a determination that the angle of the contact region is within a second range of angle values different than a first range of angle values.

24. The apparatus of claim 9, wherein the control unit is configured to generate the first operation upon a determination that an eccentricity of the contact region is less than a second threshold value.

* * * * *